UNITED STATES PATENT OFFICE.

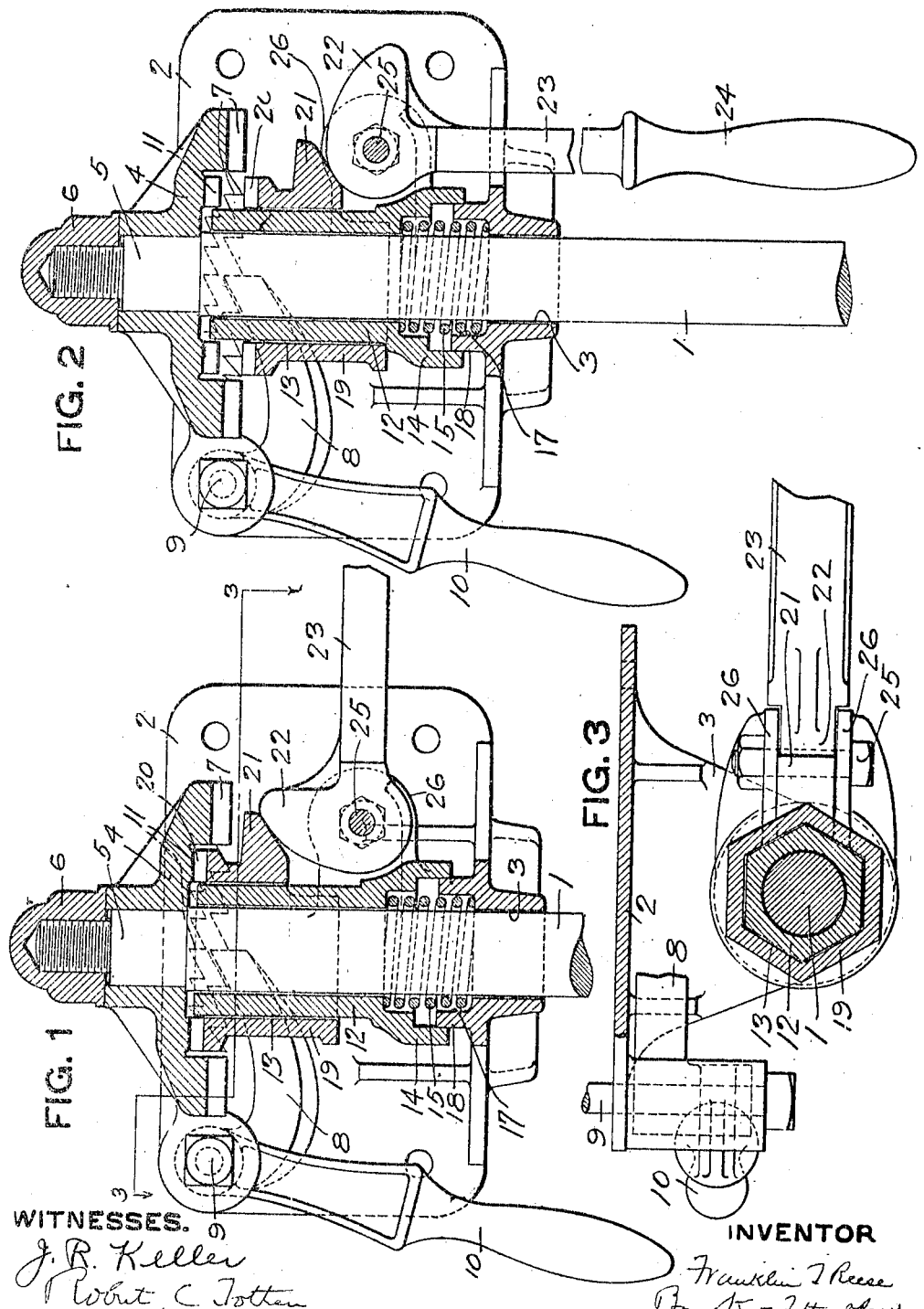

FRANKLIN T. REESE, OF PITTSBURGH, PENNSYLVANIA.

HAND-BRAKE RATCHET.

1,090,230.   Specification of Letters Patent.   Patented Mar. 17, 1914.

Application filed June 23, 1913.   Serial No. 775,389.

*To all whom it may concern:*

Be it known that I, FRANKLIN T. REESE, a citizen of the United States, and resident of Pittsburgh, in the county of Allegheny and State of Pennsylvania, have invented a new and useful Improvement in Hand-Brake Ratchets; and I do hereby declare the following to be a full, clear, and exact description thereof.

My invention relates to improvements in railway hand brakes and is particularly concerned with improvements in brake operating mechanism in which the brake actuating handle may normally hang vertically, parallel with the brake shaft and out of the way, and may be brought up into horizontal or operating position and at the same time may be clutched into operating engagement with the brake shaft.

The invention further contemplates a construction in which the drop of the brake handle to inoperative position causes the disengagement of the clutch with the brake shaft.

In the drawings in which is illustrated the preferred embodiment of the invention, Figure 1 is a fragmentary vertical sectional view of my improved hand brake operating mechanism, showing the handle in operative position; Fig. 2 is a view similar to Fig. 1, showing the handle in inoperative position; and Fig. 3 is a horizontal sectional view on the line 3—3 Fig. 1.

In the drawings 1 indicates the brake shaft to which the usual brake chain connected with the brake mechanism proper is attached. This shaft may be supported at its upper end by the hand rail of the car platform, or as shown here, it may be journaled in a bearing bracket or plate 2 bolted to the side of the car and having a journal bearing 3 through which the shaft passes. To the upper end of the brake shaft is fixed a shaft actuating ratchet plate or cap 4, which may be fixed on the extreme angular end 5 of the shaft by means of a nut 6, said plate or cap having teeth 7 adapted to be engaged by a pawl arm 8 fixed to a pintle 9 pivoted on the bearing bracket or plate 2, said pintle also having fixed thereto a handle 10 by which the pawl may be disengaged from the ratchet cap when desired. This ratchet cap or plate is also provided with a second annular series of teeth 11 just inside of and concentric with the pawl series 7.

In order to actuate the brake shaft by hand, said shaft has rotatably mounted thereon a sleeve 12 which, as shown in Fig. 3, has a hexagonal outer surface 13. The lower end of this sleeve is cupped at 14 to receive a spring 15, one end of which is seated in a cupped recess 17 of the bearing bracket 2. As seen in Figs. 1 and 2, the lower cup end 14 of this sleeve has a rotatable bearing also on the walls 18 of the recess 17. Normally the spring 15 holds the sleeve 12 in elevated position. Slidably mounted on the rotatable sleeve 12 is a second sleeve 19 hexagonal in shape to fit over the hexagonal face of the first sleeve 12 to rotate therewith on the shaft. The upper end of sleeve 19 is provided with a series of teeth 20, which are adapted to engage the teeth 11 of the ratchet cap, 4. This outer sleeve is provided with a cam lug 21 adapted to rest upon the cam shaped extremity 22 of a hand lever 23 having the handle 24. This hand lever is pivoted at 25 in lugs 26 extending laterally from the inner rotatable sleeve 12. When the hand lever is in inoperative position, as shown in Fig. 2, this outer ratchet sleeve 19 moves down and its teeth are thus disengaged from the teeth 11 of the cap ratchet. When, however, the operating handle is brought up to horizontal position, as indicated in Fig. 1, the cam lug 21 raises the sleeve 19 and engages its teeth with the ratchet teeth 11. When the handle is then turned in the usual manner to apply the brakes the outer ratchet sleeve 19 rotates with the inner sleeve 12 and thereby through the ratchet teeth 20 and 11, the latter on the cap ratchet 4, the brake shaft is rotated to apply the brakes. During this movement of the ratchet cap 4 the stop pawl 8 rides idly over the pawl teeth 7 of said cap. In bringing the hand lever 23 back to position for a second wind or application of power the series of teeth 20 on the outer sleeve 19 ride down over the series of teeth 11 of the cap. This is permitted by the yielding of the spring 15 which permits the inner sleeve 12, the outer sleeve 19 and the handle 23 to move down slightly as a unit. The moment the direction of movement of the hand lever is reversed for a second power stroke, the spring 15 returns these parts to elevated position, again engaging the teeth 20 with the ratchet teeth 11 of the cap ratchet.

It is obvious that the hand lever 23 may be dropped to inoperative position at any point in its movement around the shaft 1, but preferably it is dropped back at a position closely adjacent the hand rail of the car or the wall of the car to which the brake mechanism is attached. Also when the hand lever drops to operative position the stop pawl 8 by reason of the weight of its handle 10 prevents release of the brake and the same is ordinarily released by slightly lifting this pawl handle 10.

It will be seen therefore that the above described mechanism provides effective and simple means for applying power to the brake shaft by means of the hand lever which normally lies entirely out of the way and which when raised to operative position simultaneously throws in the clutch connection with the brake shaft. Likewise when this handle is released the clutch mechanism is automatically disengaged from its connection with the brake shaft. One of the advantages of this form of construction is that the ratchet mechanism is perfectly accessible at all times, as it lies entirely on the outside of the hub of the shaft actuating mechanism instead of being inclosed within said hub. Furthermore, inasmuch as both series of ratchet teeth are on the under side of the ratchet cap 4 they are protected against clogging by dirt, ice or snow. Likewise, inasmuch as the spring 15 is entirely inclosed within the sockets 14 and 18 it is also entirely protected against the elements.

The parts may be readily assembled after the bearing plate is secured in place and upon the shaft merely by dropping the spring 15 and then the actuating sleeve 12 with the ratchet sleeve 19 thereon, if desired, over the end of the brake shaft with the spring interposed between the inner sleeve and the bracket. The ratchet cap 4 is then dropped over the screw end 5 of the brake shaft and secured in position by the nut 6. Any one or more of these parts may be readily replaced when desired if worn out or broken.

What I claim is:

1. In brake mechanism, the combination with a brake shaft, and the bearing bracket therefor, of a hub rotatably mounted on said shaft, a handle pivoted to said hub and adapted normally to lie parallel with said shaft, a ratchet member slidably but non-rotatably mounted on said hub, a second ratchet member fixed on said shaft, and means so constructed and arranged that when said actuating lever is raised to operative position said slidable ratchet member will be thrown into engagement with said shaft ratchet to actuate the shaft and turn it in one direction and means to permit said slidable ratchet member to ride idly over said second ratchet member when moved in the reverse direction.

2. In brake mechanism, the combination with a brake shaft, and a bearing bracket therefor, of an actuating hub rotatably mounted on said shaft and having a brake lever pivoted thereto adapted normally to extend parallel to the shaft, a ratchet member slidably but non-rotatably mounted on said hub having a series of ratchet teeth, a second ratchet member fixed on said shaft, said lever having means to move said first ratchet member into engagement with the second when the lever is raised to operative position and means to permit said first ratchet member to ride idly over the second when said hub is rotated in one direction on the shaft.

3. In a brake mechanism, the combination with a brake shaft and a bearing bracket therefor, of a sleeve or hub rotatably and slidably mounted on said shaft, a spring interposed between said hub and bearing bracket, a ratchet sleeve slidably but non-rotatably mounted upon said hub, a ratchet member fixed to said shaft, a hand lever pivoted on said hub and having a cam member adapted to engage a corresponding cam member on said ratchet sleeve whereby when said lever is raised to operative position said ratchet sleeve will be brought into engagement with said fixed ratchet member for operation of the shaft, said spring support of said hub permitting said ratchet sleeve to ride idly over the ratchet teeth of said fixed ratchet during the reverse movement of said lever.

4. In a brake mechanism, the combination with a brake shaft and a bearing bracket therefor, of a ratchet member fixed on the end of said shaft, an actuating hub rotatably and slidably mounted on the shaft, a spring interposed between said bearing bracket and said hub to hold the latter normally in elevated position, a ratchet sleeve slidably but non-rotatably mounted upon said hub, a series of ratchet teeth on the under side of said fixed ratchet member adapted to be engaged by the teeth of said ratchet sleeve, a hand lever pivoted upon said hub and adapted normally to hang in vertical position parallel with the shaft, said lever and said ratchet sleeve having coöperating cam members whereby when said lever is raised to operative position the teeth of said ratchet sleeve will be engaged with those of said fixed ratchet member for operation of the shaft, said spring permitting said ratchet sleeve to ride idly over said fixed ratchet while the hand lever is raised in its operative raised position.

In testimony whereof, I the said FRANKLIN T. REESE have hereunto set my hand.

FRANKLIN T. REESE.

Witnesses:
ROBERT C. TOTTEN,
JOHN F. WILL.